United States Patent
Mata et al.

(10) Patent No.: US 11,430,998 B2
(45) Date of Patent: Aug. 30, 2022

(54) FUEL CELL INTERCONNECT ASSEMBLY

(71) Applicant: The Boeing Company, Chicago, IL (US)

(72) Inventors: Marianne E. Mata, Dana Point, CA (US); Ali Yousefiani, Tustin, CA (US); Adam J. Lang, Orange, CA (US); Bruno Zamorano Senderos, Huntsville, AL (US); Chellappa Balan, Mason, OH (US)

(73) Assignee: THE BOEING COMPANY, Chicago, IL (US)

( * ) Notice: Subject to any disclaimer, the term of this patent is extended or adjusted under 35 U.S.C. 154(b) by 180 days.

(21) Appl. No.: 16/735,464

(22) Filed: Jan. 6, 2020

(65) Prior Publication Data

US 2021/0210768 A1 Jul. 8, 2021

(51) Int. Cl.
*H01M 8/0202* (2016.01)
*H01M 8/2404* (2016.01)
*H01M 8/0271* (2016.01)
*H01M 8/12* (2016.01)

(52) U.S. Cl.
CPC ....... *H01M 8/0202* (2013.01); *H01M 8/0271* (2013.01); *H01M 8/2404* (2016.02); *H01M 2008/1293* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,656,625 B1 * | 12/2003 | Thompson | H01M 8/241 429/465 |
| 2004/0219417 A1 | 11/2004 | Finkenwirth et al. | |
| 2007/0134537 A1 | 6/2007 | Reisdorf et al. | |
| 2010/0159304 A1 | 6/2010 | Quek et al. | |
| 2019/0148740 A1 | 5/2019 | Premkumar et al. | |
| 2020/0168919 A1 * | 5/2020 | Li | H01M 8/0232 |
| 2021/0143448 A1 * | 5/2021 | Blackburn | H01M 8/0245 |

OTHER PUBLICATIONS

European Patent Office, Extended European Search Report Issued in Application No. 20202711.6, dated Apr. 1, 2021, Germany, 7 pages.

* cited by examiner

*Primary Examiner* — Alix E Eggerding
(74) *Attorney, Agent, or Firm* — Alleman Hall Creasman & Tuttle LLP (57) ABSTRACT

A fuel cell stack is described. The fuel cell stack comprises an interconnect assembly comprising a cathode-side interface coupled to an interconnect via a first joint, and an anode-side interface coupled to the interconnect via a second joint, the interconnect assembly having a first coefficient of thermal expansion (CTE) at an interface side of the interconnect assembly. The fuel cell stack further comprises a fuel cell element coupled to the interconnect assembly at the interface side via a hermetic seal, the fuel cell element having a second CTE at the interface side, the first CTE and the second CTE satisfying a predetermined CTE matching condition.

20 Claims, 7 Drawing Sheets

FUEL CELL INTERCONNECT ASSEMBLY

GOVERNMENT LICENSE RIGHTS

The invention described herein was made in the performance of work under NASA Contract No. (NNL17AA45T) and is subject to the provisions of Section 305 of the National Aeronautics and Space Act of 1958 (72 Stat.435: 42U.S.C.2457.)

FIELD

The disclosure relates to fuel cells, and more particularly to solid oxide fuel cell (SOFC) stacks.

BACKGROUND

A fuel cell is an electrochemical device that generates current through redox reactions involving a fuel and an oxidizing agent. Various fuel cell types exist, which are characterized by their physical arrangement, material composition, and electrical activity. One such type is referred to as a solid oxide fuel cell (SOFC), which employs a solid oxide electrolyte to conduct negative ions from a cathode to an anode. In a typical SOFC, negative oxygen ions are produced by reacting oxygen with electrons at the cathode. The electrolyte, which can comprise a ceramic material such as yttria-stabilized zirconia, conducts negative ions to the anode, where oxidation between ions and hydrogen produces water and electrical current. The anode can also reform a hydrocarbon to produce additional fuel for consumption by the fuel cell. Together, these components can provide current generation with high efficiency and stability, low emissions, and support for different fuels.

SOFCs are also defined by their operation at relatively high temperatures—for example, between 500° C. and 1000° C. While high temperature operation enables the omission of a platinum catalyst for an SOFC to function, different parts of the SOFC having different material composition undergo different rates of thermal expansion as the SOFC reaches operating temperatures. In these and other settings, it will often be desirable to inhibit the release of gases involved in the electrochemical conversion process.

SUMMARY

According to one aspect of the present disclosure, a fuel cell stack is provided. In this aspect, the fuel cell stack comprises an interconnect assembly comprising a cathode-side interface coupled to an interconnect via a first joint, and an anode-side interface coupled to the interconnect via a second joint, the interconnect assembly having a first coefficient of thermal expansion (CTE) at an interface side of the interconnect assembly. The fuel cell further comprises a fuel cell element coupled to the interconnect assembly at the interface side via a hermetic seal, the fuel cell element having a second CTE at the interface side, the first CTE and the second CTE satisfying a predetermined CTE matching condition.

Another aspect of the present disclosure relates to a method of manufacturing a fuel cell stack. The method comprises forming an interconnect assembly by joining a cathode-side interface to an interconnect at a first side of the interconnect, and joining an anode-side interface to the interconnect at a second side of the interconnect, the interconnect assembly having a first coefficient of thermal expansion (CTE) at an interface side of the interconnect assembly. The method further comprises hermetically sealing the interconnect assembly to a fuel cell element at the interface side, the fuel cell element having a second CTE, the first CTE and the second CTE satisfying a predetermined CTE matching condition.

Another aspect of the present disclosure relates to a solid oxide fuel cell stack. The solid oxide fuel cell stack comprises a unitary interconnect assembly comprising a cathode-side interface coupled to an interconnect via a first braze joint, and an anode-side interface coupled to the interconnect via a second braze joint, the interconnect assembly having a first coefficient of thermal expansion (CTE) at an interface side of the interconnect assembly. The solid oxide fuel cell stack further comprises a fuel cell element coupled to the interconnect assembly at the interface side via a hermetic seal, the fuel cell element having a second CTE at the interface side, the first CTE and the second CTE satisfying a CTE matching condition.

The features, functions, and advantages that have been discussed can be achieved independently in various embodiments or can be combined in yet other embodiments, further details of which can be seen with reference to the following description and drawings.

DETAILED DESCRIPTION

In view of the considerations discussed above, methods and apparatuses are provided that relate to a fuel cell stack including an interconnect assembly and a fuel cell element. The fuel cell element is coupled to the interconnect assembly via a hermetic seal at an interface side of the interconnect assembly. At the interface side, the interconnect assembly has a first coefficient of thermal expansion (CTE), and the fuel cell element has a second CTE. The first CTE and the second CTE satisfy a predetermined CTE matching condition. The satisfaction of the predetermined CTE matching condition provides a closer correspondence between the thermal expansion rates of the interconnect assembly and fuel cell element, which in turn preserves the integrity of the hermetic seal between the interconnect assembly and fuel cell element, and averts leakage of reactant gasses in the fuel cell, including during pressurized operation. In this way, the efficiency of the fuel cell is increased.

In some examples, satisfaction of the predetermined CTE matching condition can be achieved between an electrode interface in the interconnect assembly and a fuel cell element. This can enable the use of a metallic interconnect and a ceramic fuel cell element that do not satisfy the predetermined CTE matching condition, while still achieving hermetic sealing of reactant gases. Accordingly, the interconnect can be implemented with metallic materials that are cheaper, lighter, and more resistant to high temperature degradation, and with reduced thickness, compared to an interconnect comprised of a material specifically configured to match the CTE of the fuel cell element. In this way, fuel cell efficiency and economy can be enhanced.

The examples described herein can help address drawbacks associated with other approaches to sealing fuel cells that experience different rates of thermal expansion. One such approach involves hermetically sealing CTE-mismatched components, such as via a glass-ceramic seal. However, a CTE mismatch between components can produce mechanical stress as a fuel cell heats up, which can result in cracks in the seal and thus leakage. Further, stress induced by the CTE mismatch can increase as the fuel cell is upsized, inhibiting the ability to increase power output from the fuel cell by upsizing. As such, another approach provides a non-hermetic seal between CTE-mismatched components that physically shifts as adjacent components undergo thermal expansion. While the non-hermetic seal can reduce stress, increased gas leakage can occur. Moreover, the non-hermetic seal may be infeasible in implementations where a fuel cell is pressurized above ambient pressure, as in some solid oxide fuel cells (SOFCs). Pressurization increases the density of reactant gas in a fuel cell and thus its output; however, pressurization compounds leakage from non-hermetic seals, which can result in unacceptable losses.

Another approach to addressing CTE mismatch in a fuel cell configures a metallic interconnect with a material having a CTE that more closely matches the CTE of ceramic components that the interconnect is arranged in proximity to. The interconnect material can provide a closer correspondence between the rate of thermal expansion of the interconnect and the rate of thermal expansion of the ceramic materials. The interconnect material can be significantly porous, however, producing leakage. While the material thickness can be increased to compensate, this reduces conductivity of the interconnect and increases fuel cell weight, in turn reducing efficiency and economy.

Weight is a particular concern in mobile applications such as aircraft and vehicles, where the maximization of output per unit weight is sought. This has driven the development of pressurized fuel cells, where pressurization compounds leakage as described above. Accordingly, examples are disclosed herein that provide CTE-matching functionality and preserve hermetic sealing to avert leakage in the presence of pressurized and heated fuel cell operation.

Figure 1:
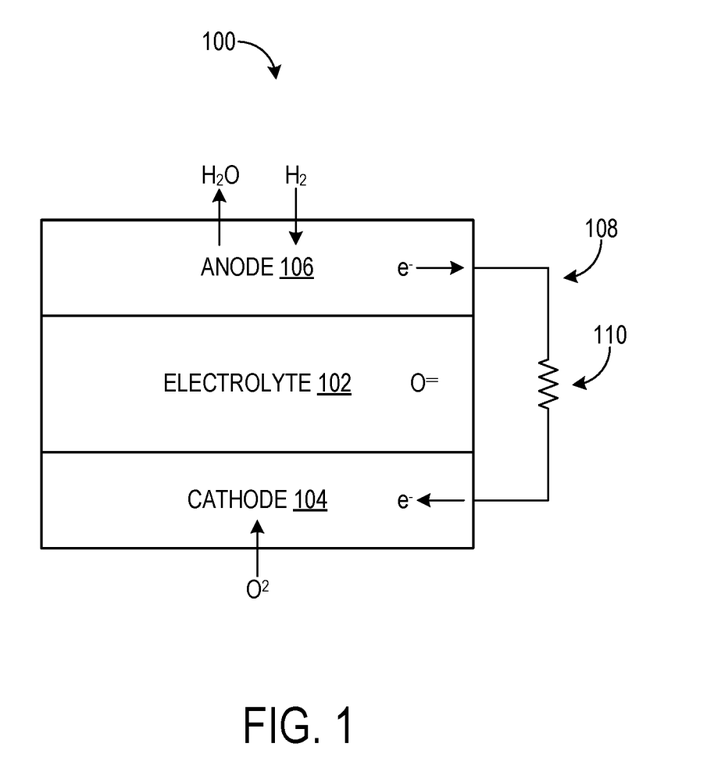
FIG. 1 shows an illustration depicting a block diagram of an example fuel cell element.

FIG. 1 illustrates a block diagram of an example fuel cell element 100. Element 100 is an electrolyte-supported SOFC element having a solid oxide electrolyte 102 comprised of ceramic material(s) such as yttria-stabilized zirconia (YSZ), scandia-stabilized zirconia (ScSZ), and/or gadolinium doped ceria (GDC), among other possibilities. Electrolyte 102 is arranged between a cathode 104 and an anode 106. Cathode 104 can be comprised of YSZ and/or lanthanum strontium manganite (LSM), and anode 106 can be comprised of a cermet material, for example. The components of element 100 can include any suitable material(s), however. Further, element 100 can be an anode-supported SOFC element in other examples.

The electrochemical components of element 100—i.e., electrolyte 102, cathode 104, and anode 106—cooperate to generate electrical current through redox reactions involving a fuel and oxidizing agent. In particular, cathode 104 receives dioxygen ($O_2$), which can be derived from ambient air, for example, and electrons ($e^-$), which are received from a circuit 108 coupled to cathode 104 and anode 106 at different ends. Dioxygen and electrons react at cathode 104 to form negative oxygen ions ($O=$), which are conducted through electrolyte 102 to anode 106. At anode 106, oxygen ions and dihydrogen ($H_2$) undergo oxidation to produce electrons, which are directed to circuit 108. In some examples, dihydrogen can be produced by reforming a hydrocarbon source (e.g., natural gas) by reacting the hydrocarbon source with air or steam. The reformation process can take place internally or externally to element 100, and can use water produced as a byproduct of oxidation at anode 106.

Electrical current generated at anode 106 is directed to circuit 108 to power a load 110 in circuit 108. Load 110 can assume any suitable form—for example, electricity conducted through circuit 108 can power wheels on a terrestrial vehicle, a propeller of an aircraft or waterborne vehicle, a turbine, hydraulic machinery, or any other suitable load.

Figure 2A:
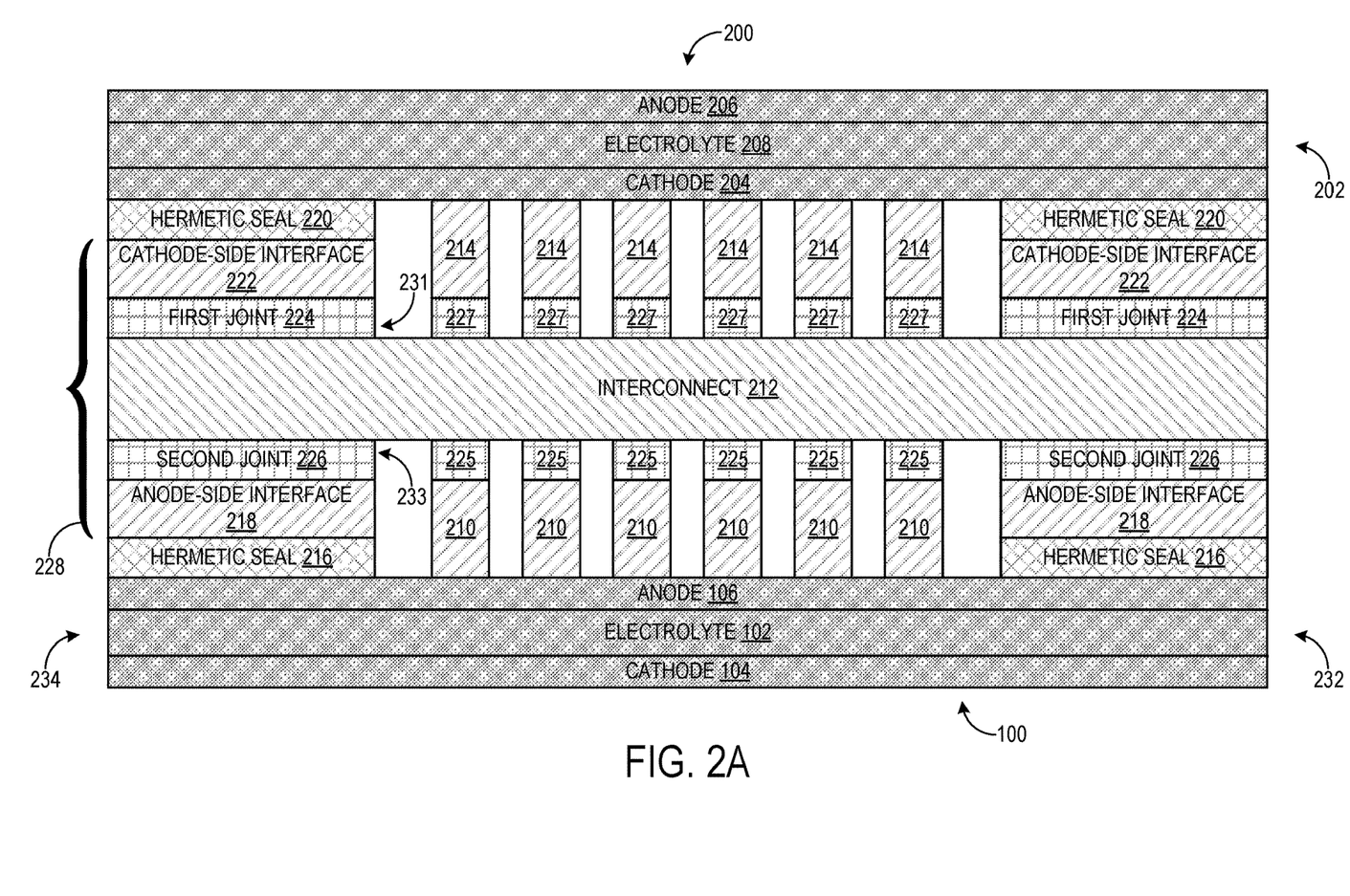
FIGS. 2A-2C respectively show illustrations depicting cross-sectional views of example fuel cell stacks incorporating the fuel cell element of FIG. 1.

Element 100 can be combined with other components that perform mechanical and/or electrochemical functions to provide one or more fuel cells. FIG. 2A shows a cross-sectional view of an example fuel cell stack 200 incorporating a variety of components including element 100 and another fuel cell element 202. Fuel cell element 202 includes a cathode 204 and an anode 206 arranged on opposing sides of an electrolyte 208. Fuel cell element 202 can be configured similarly to element 100—e.g., as an electrolyte-supported SOFC including ceramic material(s). Stack 200 can include additional or alternative components not shown in FIG. 2A, examples of which are described below with reference to FIG. 4. Further, one or more of the components depicted in FIG. 2A can form integral, repeat units that can be combined with additional repeat units to implement a fuel cell stack.

Through various components in stack 200, fuel cell elements 100 and 202 are electrically coupled together to combine their output currents in series. In particular, anode 106 of element 100 is electrically coupled to a plurality of anode-side interface sections 210, which direct current generated at anode 106 to an interconnect 212. Interconnect 212 directs current received from anode-side interface sections 210 to a plurality of cathode-side interface sections 214, which direct current received from interconnect 212 to cathode 204 of fuel cell element 202. Thus, current generated at anode 106 of element 100 can be provided to cathode 204 of fuel cell element 202 to facilitate electrochemical operation within fuel cell element 202 and current generation at anode 206, and to combine the output currents of elements 100 and 202 in series.

In the depicted example, anode-side interface sections 210 and cathode-side interface sections 214 are formed in discrete portions distributed across the lateral dimension of stack 200. Interface sections 210 and 214 can be implemented in any suitable manner, however, such as substantially continuous layers that provide electrical coupling between fuel cell elements and interconnect 212. Further, interface sections 210 and 214 can share a material composition with anode-side and cathode-side interfaces described below, and in some examples can be formed with the interfaces in a common process.

To avert the leakage of reactant gases from stack 200, stack 200 includes various seals between components. Specifically, stack 200 includes a first hermetic seal 216 between element 100 and an anode-side interface 218, and a second hermetic seal 220 between fuel cell element 202 and a cathode-side interface 222. Hermetic seals 216 and 220 can each take the form of a glass-ceramic seal, for example, or any other suitable type of hermetic seal. As described in further detail below, interfaces 218 and 222 provide desired spacing in stack 200 (e.g., to provide space for interface sections 210 and 214) and CTE matching functionality with fuel cell elements 100 and 202.

Stack 200 also includes a first joint 224 between interconnect 212 and cathode-side interface 222, and a second joint 226 between interconnect 212 and anode-side interface 218. In some examples, joints 224 and 226 respectively form a first hermetic seal 231 and a second hermetic seal 233. Hermetic seals 231 and 233 provide hermetic sealing to avert reactant gas leakage from stack 200. Further, joints 224 and 226 can act to transfer mechanical stress from hermetic seals 216 and 220 to interconnect 212, which may have greater load-bearing capability than hermetic seals 216 and 220. This transfer of stress aids in preserving the structural integrity of hermetic seals 216 and 220 as stack 200 undergoes thermal expansion, averting cracks and resultant leakage. Stress transfer to interconnect 212 can also render the upsizing of stack 200 more practicable.

Joints 224 and 226 can take any suitable form. In some examples, joints 224 and 226 each include a braze joint formed during a brazing process. In this process, first joint 224 is formed as a first braze joint by brazing cathode-side interface 222 to interconnect 212, and second joint 226 is formed as a second braze joint by brazing anode-side interface 218 to interconnect 212. The braze joints can provide increased strength and elasticity relative to joints formed via other processes. For example, greater strength and elasticity can be provided relative to glass seal joining processes, which can produce glass bonds that are relatively more brittle. As particular examples, brazing can provide an increased shear strength of between 15 and 100 times stronger than that of a glass bond, depending on the particular glass and braze. Further, braze joints can have an elasticity at least twice as much as that of a glass joint. Methods of joining components in stack 200 other than brazing can be used, however, including but not limited to rolling, (e.g., ultrasonic) welding, additive manufacturing techniques, and other material deposition processes.

Stack 200 also includes a plurality of anode-side interconnect joints 225 between anode-side interface sections 210 and interconnect 212, and a plurality of cathode-side interconnect joints 227 between cathode-side interface sections 214 and interconnect 212. In this example, each anode-side interconnect joint 225 is substantially aligned with a corresponding anode-side interface section 210, and each cathode-side interconnect joint 227 is substantially aligned with a corresponding cathode-side interface section 214, along the longitudinal axis of stack 200. In some examples, interconnect joints 225 and 227 can share a common material composition with first joint 224 and second joint 226, and thus can provide at least some of the functionality offered by joints 224 and 226. Further, interconnect joints 225 and 227 can be formed with interfaces 218 and 222 in a common process, including but not limited to the brazing process described above.

In some examples, first joint 224 and second joint 226 can provide hermetic sealing as described above, whereas anode-side interconnect joints 225 and cathode-side interconnect joints 227 may not provide hermetic sealing. As described in further detail below with reference to FIG. 3, hermetic sealing can be provided toward the exterior portion of stack 200. Stack 200 can implement hermetic sealing at any suitable location, however.

When joined together, interconnect 212, cathode-side interface 222, first joint 224, second joint 226, and anode-side interface 218 form an interconnect assembly 228. In some examples, and after its formation, interconnect assembly 228 can be subsequently joined to fuel cell element 100 via hermetic seal 216, and to fuel cell element 202 via hermetic seal 220 (and, potentially, via joints 225 and/or joints 227). In such examples, interconnect assembly 228 can be formed as a unitary assembly—i.e., formed from multiple parts that collectively form a single unit that is joined as a single assembly to elements 100 and 202.

Interconnect 212 can have a CTE that significantly differs from the CTEs of fuel cell elements 100 and 202. This CTE mismatch can result from a difference between the material composition of interconnect 212 and that of elements 100 and 202—for example, interconnect 212 can be comprised of metallic material(s) (e.g., steel), whereas elements 100 and 202 can be comprised of ceramic materials (e.g., YSZ, ScSZ, and/or LSM) as described above. The CTE mismatch can manifest in significantly different rates of thermal expansion between interconnect 212 and fuel cell elements 100 and 202 as stack 200 is raised to operating temperature (e.g., between 500° C. and 1000° C.) to initiate electrochemical operation.

To maintain hermetic sealing in the presence of differing rates of thermal expansion between interconnect 212 and fuel cell elements 100 and 202, interconnect assembly 228 is configured with a specific CTE at the sides at which interconnect assembly 228 couples to elements 100 and 202. Here, the specific CTE of interconnect assembly 228, together with each CTE of element 100 and 202, satisfies a predetermined CTE matching condition, which generally provides a sufficiently close match between the thermal expansion rates of interconnect assembly 228 and each of elements 100 and 202 to maintain the structural integrity of hermetic seals 216 and 200, and joints 224, 225, 226, and 227. For example, at an interface side 230 at which interconnect assembly 228 is coupled to element 100, interconnect assembly 228 is configured with a first CTE, and element 100 is configured with a second CTE—i.e., a CTE different from the first CTE. The first CTE of interconnect assembly 228 and the second CTE of element 100 satisfy the predetermined CTE matching condition. Further, in some examples, interface sections 210 and/or 214 can have respective CTEs that, along with the CTE of elements 100 and/or 202, satisfy the predetermined CTE matching condition. For example, interface sections 210 and/or 214 can share a common material composition with anode-side interface 218 and/or cathode-side interface 222. Further, in some examples one or more of interface sections 210, interface sections 214, joints 225, and joints 227 can be part of interconnect assembly 228.

The predetermined CTE matching condition can be defined in any suitable manner. For example, the matching condition can stipulate that the CTE of interconnect assembly 228, and the CTE of each element 100 or 200, are within 10% of each other. As another example, the matching condition can stipulate that the CTE of interconnect assembly 228, and the CTE of each element 100 or 200, are within $1E-6$ $K^{-1}$ of each other. As such, a "CTE match" or "CTE-matching" between CTEs of different components refers to a minimum (but not an exact) correspondence between CTEs in addition to an exact match between CTEs. Components that correspond in this manner are referred to as "CTE-matched" components.

The criteria with which the CTE matching condition is defined can vary depending on the design of a fuel cell stack—e.g., the materials and geometry of the fuel cell stack. For example, a relatively smaller fuel cell stack may allow for a greater tolerance in CTE matching (e.g., a larger CTE mismatch that still satisfies the CTE matching condition); as a CTE can be defined in terms of the ratio of a change in length divided by actual length, a mismatch has a lesser effect where the stack is smaller. Thus, CTE matching criteria are dependent upon fuel cell design. Further, the matching condition may be defined for coefficients of linear thermal expansion, coefficients of volume thermal expansion, or both. Alternatively, separate matching conditions can be defined for coefficients of linear thermal expansion, and for coefficients of volume thermal expansion, respectively. As yet another example, the matching condition can be defined in terms of a correspondence between the material compositions of interconnect assembly 228 and each of elements 100 and 200. Any suitable methods can be used to determine a CTE matching condition between elements, including but not limited to computational, analytic, and modeling methods (e.g., mechanical modeling). In some implementations, experimental techniques can be used to measure the CTE for each element in a fuel cell stack, and CTE matching conditions can be assessed based on the measured CTEs via the methods described above.

In some examples, a CTE match in stack 200—i.e., satisfaction of the predetermined CTE matching condition—can be provided by configuring the electrode interfaces of stack 200 (e.g., one or more of anode-side interface sections 210, cathode-side interface sections 214, anode-side interface 218, and cathode-side interface 222) with a specific material composition having a CTE matching the CTE of fuel cell elements 100 and 200. As one example of a CTE-matched material, interfaces 218 and 222 can be comprised of a pressed metallurgy material. The pressed metallurgy material can be comprised of approximately 90% chrome, along with iron and other potential components.

Other components of interconnect assembly 228 may not be CTE-matched with elements 100 and 202, such as interconnect 212 (e.g., due to its differing material composition relative to elements 100 and 202 as described above). As such, satisfaction of the predetermined CTE matching condition by interconnect assembly 228 and elements 100 and 202 can refer to a CTE match between one or more, and not all, of the components of interconnect assembly 228 and elements 100 and 200. In other examples, other components of interconnect assembly 228, alternatively or in addition to electrode interfaces 218 and 222, can be CTE-matched to elements 100 and 200. Further, while shown in the form of a single component, interconnect 212 can include multiple components.

Forming an interconnect from CTE-matched material(s) (i.e., that satisfy the predetermined CTE matching condition relative to the CTE of a fuel cell element) can drive greater interconnect thicknesses to provide a sufficiently strong interconnect without leakage. However, greater interconnect thickness increases fuel cell stack weight, in turn decreasing economy. In stack 200, however, electrode interfaces 218 and 222 are CTE-matched to fuel cell elements 100 and 202, which enables the preservation of hermetic sealing in stack 200 without stipulating that interconnect 212 be CTE-matched to elements 100 and 202. As such, interconnect 212 can be comprised of non-CTE-matched materials (e.g., one or more metals including steel) and with a relatively thinner profile and desired conductivity, in addition to the ability to withstand high temperatures and differing substances on either side (e.g., air on one side, hydrogen on an opposite side). In other words, interconnect 212 is not tasked with CTE matching and seal preservation in stack 200, in addition to providing desired weight and electrochemical properties; rather, these functions are distributed among interconnect 212 and electrode interfaces 218 and 222, enabling each component to perform the functions to which its material composition is adapted.

Figure 2B:
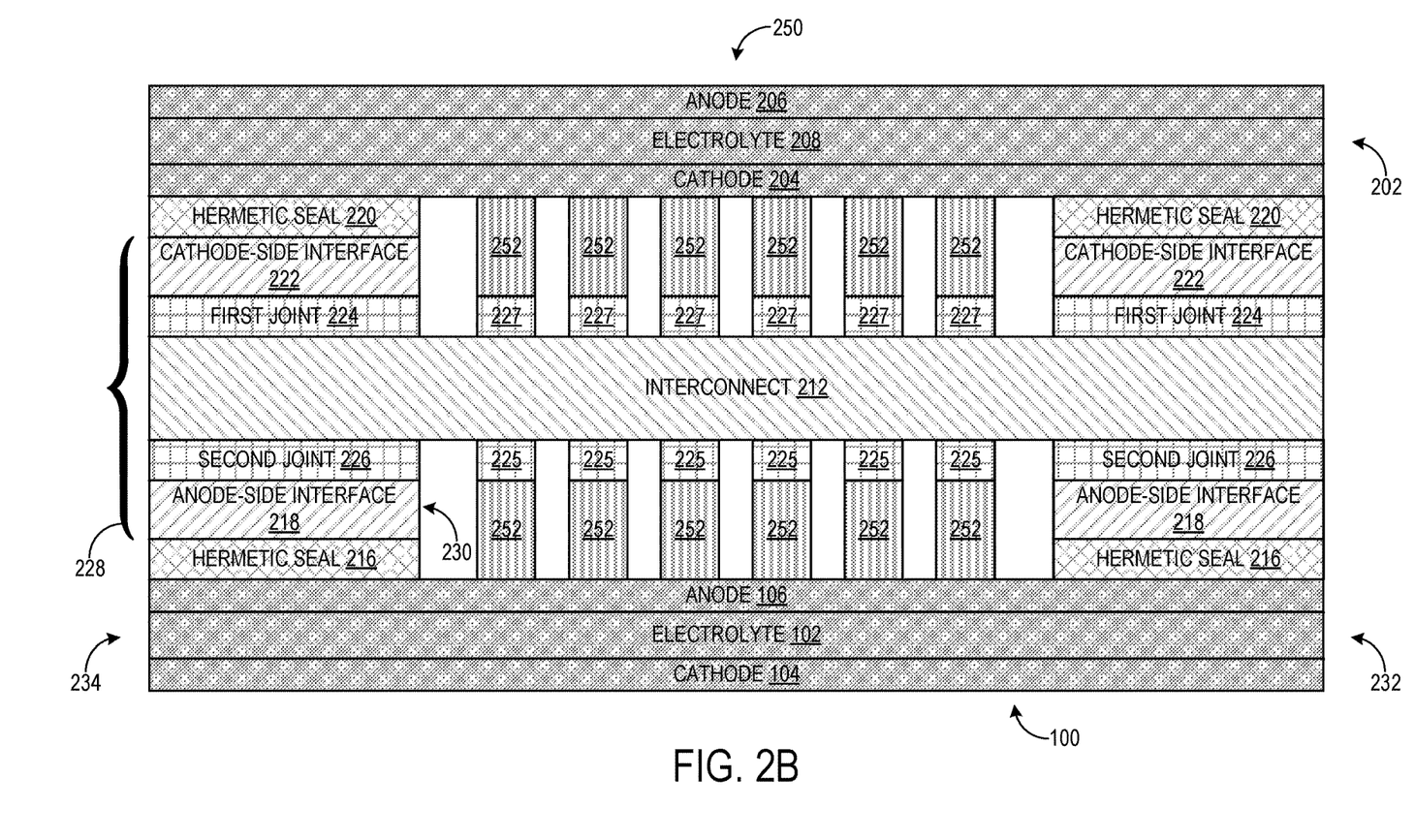

As described above, in some examples hermetic sealing can be provided in some locations in stack 200—e.g., toward an exterior portion—and not at others—e.g., in an interior portion. In such examples, where hermetic sealing is not provided, electrical conduction can be prioritized. FIG. 2B shows another fuel cell stack 250 illustrating one such example. Stack 250 incorporates aspects of stack 200 which are not repeated here. Unlike stack 200, stack 250 includes a plurality of conductor sections 252 in place of anode-side interface sections 210 and cathode-side interface sections 214. Conductor sections 252 comprise an electrically conductive material—e.g., a material that is relatively more conductive than the material comprising interface sections 210 and 214. This reduces resistance across stack 200—and stacks generally comprised of repeat units formed from stack 200—during operation, thereby increasing performance. As shown in FIG. 2B, conductor sections 252 are joined to interconnect 212 via joints 225 and 227, but can be joined to interconnect 212 in any suitable manner, such as via anode-side interfaces and/or cathode-side interfaces. Conductor sections 252 conduct electrical current between fuel cell elements as described above in relation to interface sections 210 and 214.

Figure 2C:
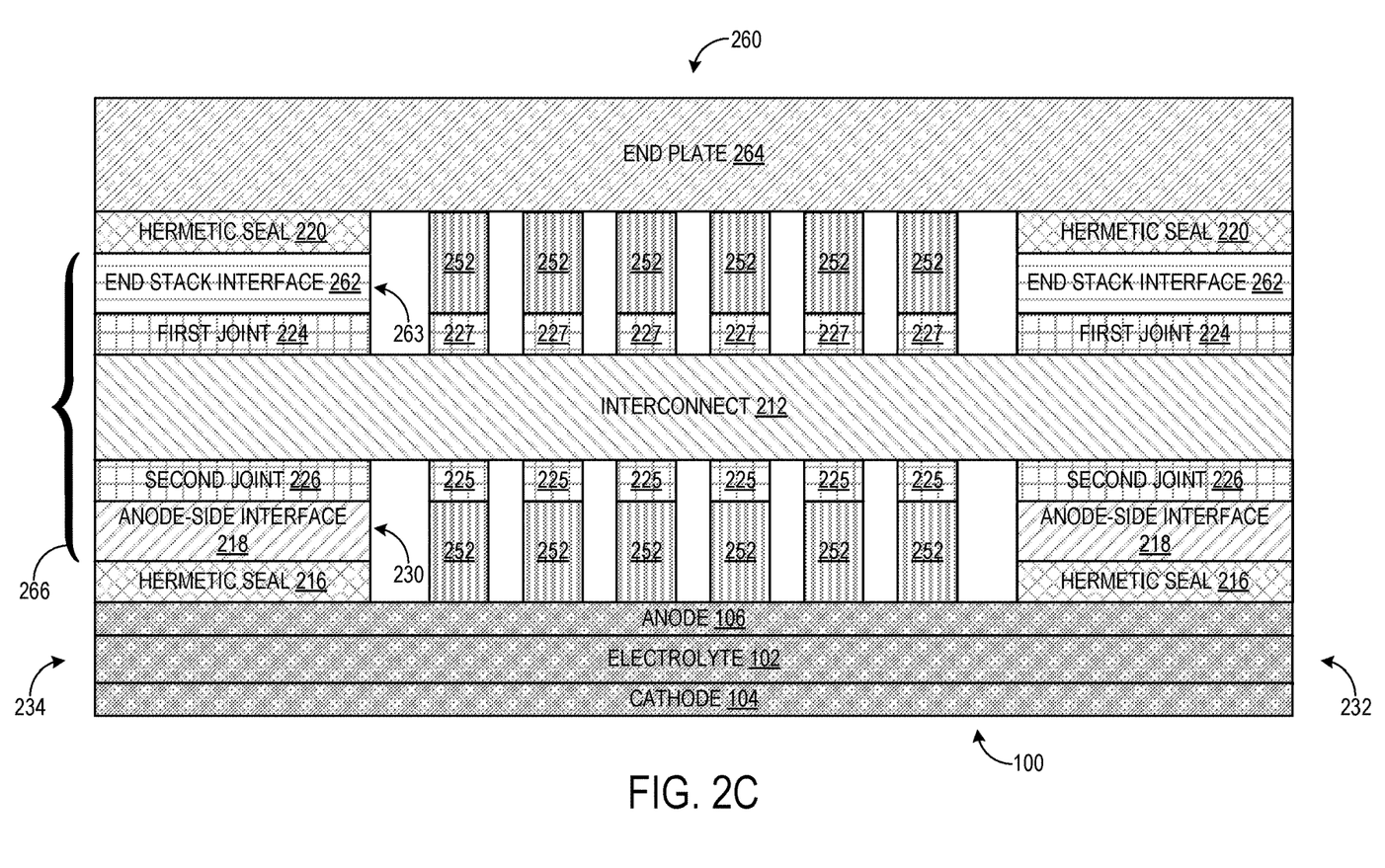

In some examples, a fuel cell stack can incorporate different interface materials on either side of an interconnect. FIG. 2C shows another fuel cell stack 260 illustrating one such example. Stack 260 incorporates aspects of stacks 200 and 250 which are not repeated here. Like stacks 200 and 250, stack 260 includes anode-side interface 218 at interface side 230 where interconnect assembly 228 is coupled to fuel cell element 100. Unlike stacks 200 and 250, stack 260 includes an end stack interface 262 at an opposing side 263 of interconnect 212 opposite interface side 230. End stack interface 262 has a different material composition than that of anode-side interface 218. Further, end stack interface 262 can have a CTE that does not satisfy the CTE matching condition relative to the CTE of fuel cell element 100 (and end stack interface 262 can thus have a CTE differing from that of anode-side interface 218). Rather than being located proximate to a fuel cell element, end stack interface 262 is instead coupled (e.g., via hermetic seal 220) to an end plate 264, which forms one end of stack 260. End plate 264 can comprise one or more metallic materials, for example. The lack of satisfaction of the CTE matching condition by end stack interface 262 may not pose adverse effects, as it is arranged proximate to end plate 264—to which end stack 262 can potentially be CTE-matched—rather than to fuel cell element 100.

While shown as being located toward the upper end of stack 260 due to the arrangement of end plate 264 at this end, end stack interface 262 alternatively or additionally can be located toward the lower end of stack 260, for example if an end plate is provided at the lower end. Generally, end stack interface 262 can be provided at any suitable location, including at locations where satisfaction of the CTE matching condition relative to a fuel cell element is not sought, but rather at locations proximate to end plates and/or other metallic components. End stack interface 262, along with first and second joints 224 and 226, interconnect 212, and anode-side interface 218, forms an interconnect assembly 266 that can be repeated in a fuel cell stack—for example, at a lower end where another end plate is provided, as described above. In view of the foregoing, interconnect assembly 266 comprises different interface materials (e.g., first materials at end stack interface 262, second materials at anode-side interface 218) at either side of interconnect assembly 266. Further, FIG. 2C also shows the inclusion of conductor sections 252 at either side of interconnect 212. However, in other examples, conductor sections 252 can be provided at one side, and not the other, of interconnect 212. In yet other examples, other components can be provided in place of conductor sections 252 at both sides of interconnect 212, such as anode-side interface sections 210 and cathode-side interface sections 214.

Figure 3:
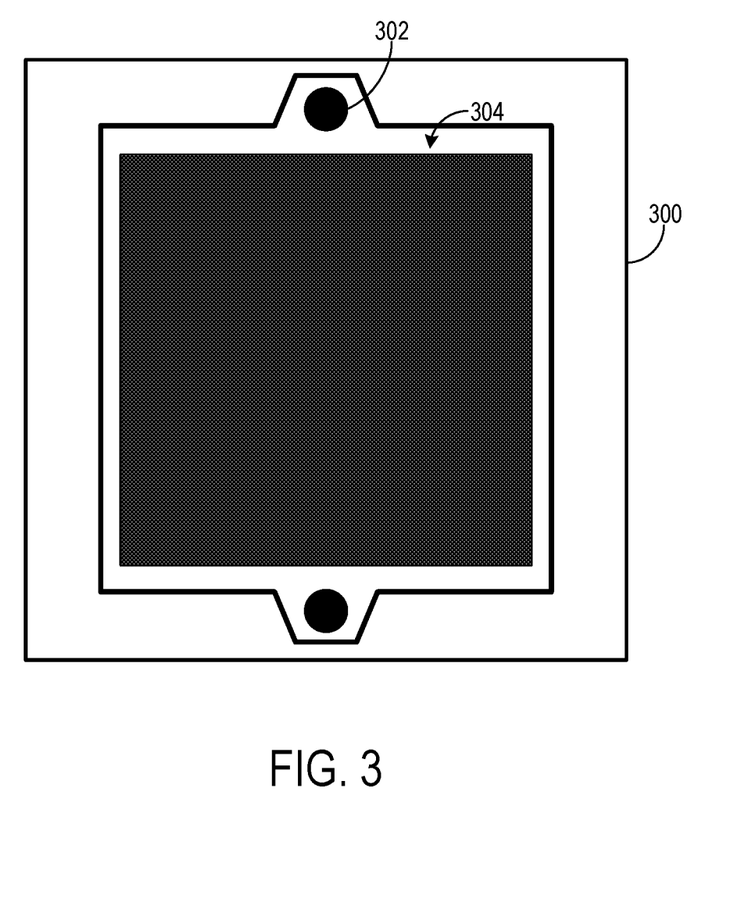
FIG. 3 shows an illustration depicting a plan view of an example fuel cell system incorporating the fuel cell stack of FIG. 2A.

In the examples depicted in FIG. 2A-2C, first and second joints 224 and 226, and hermetic seals 216 and 200, are arranged toward a first outer edge 232 and a second outer edge 234 of stack 200. In some examples, joints 224 and 226, and seals 216 and 220, extend along a perimeter of stack 200. FIG. 3 shows a plan view of fuel cell stack 200, where hermetic sealing is provided between a perimeter 300 of stack 200, and an inner gas flow channel 302 and an active electrochemical area 304 where gas is used for electrochemical reactions.

The examples described herein are applicable to other fuel cell and stack arrangements including those in which hermetic sealing is provided elsewhere—i.e., alternatively or in addition to the perimeter of a fuel cell stack. For example, joints and/or seals can be interspersed through the interior of a fuel cell stack—e.g., as with the distribution of joints 225 and 227 shown in FIGS. 2A-2C. Generally, sealing via CTE-matched electrode interfaces and hermetic seals can be provided where an interface between an interconnect assembly and fuel cell element exists, or where an interface between non-CTE-matched materials (e.g., materials having CTEs that do not satisfy the predetermined CTE matching condition) exists.

Figure 4:
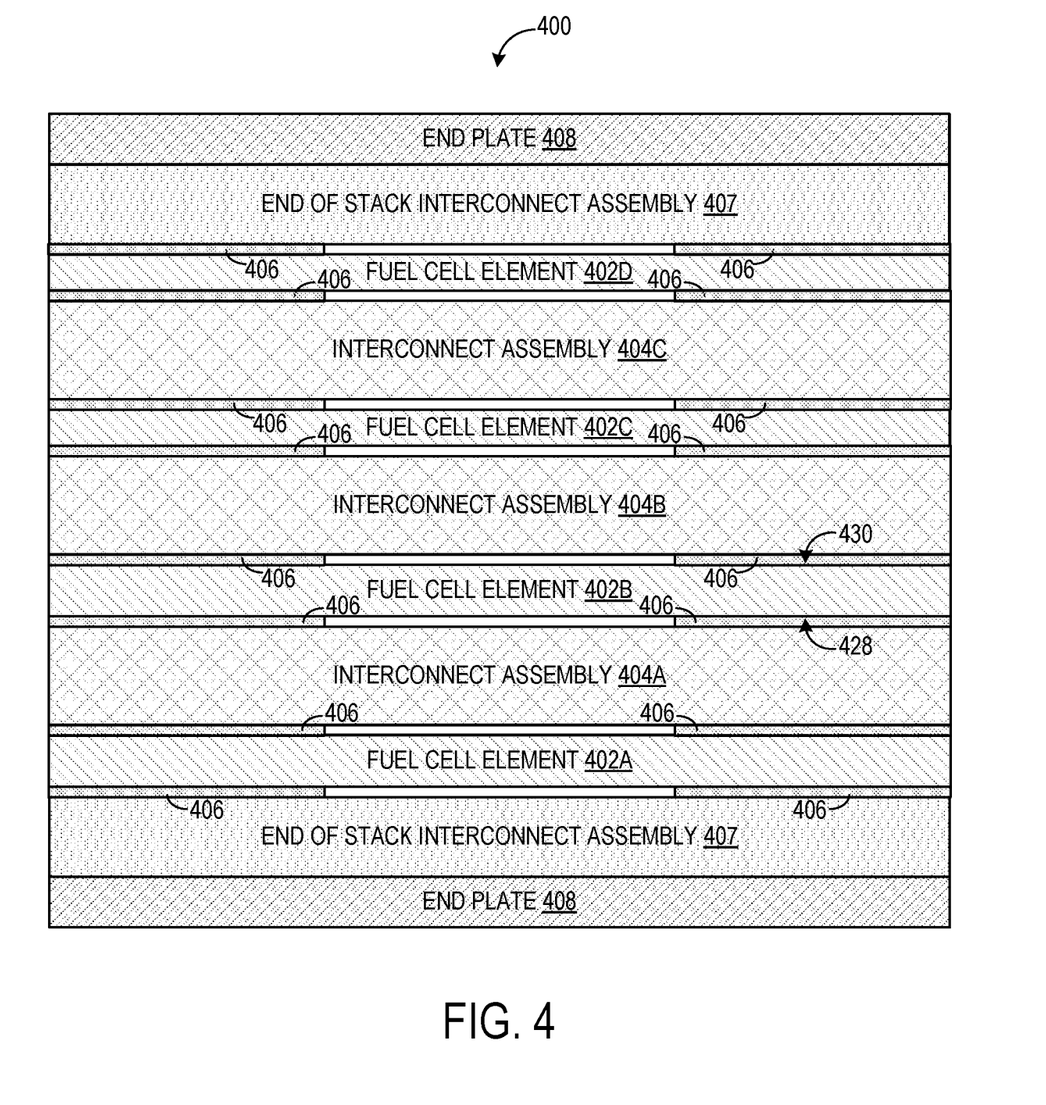
FIG. 4 shows an illustration depicting a cross-sectional view of another fuel cell stack.

FIG. 4 shows a cross-sectional view of another fuel cell stack 400 including four fuel cell elements 402. Fuel cell element 100 can be implemented as each of fuel cell elements 402, for example. Stack 400 also includes three interconnect assemblies 404 that electrically and physically couple adjacent fuel cell elements 402 on both sides through associated hermetic seals 406. Stack 400 includes two end of stack interconnect assemblies 407 that electrically and physically couple adjacent fuel cell elements on one side and stack components with potentially different material sets on the opposite side through associated hermetic seals 406. Interconnect assembly 228 can be implemented as each of interconnect assemblies 404, while interconnect assembly 266 can be implemented as each of end of stack interconnect assemblies 407, for example.

End plates 408 form the terminal ends of stack 400. End plate 264 can be implemented as each end plate 408, for example. End plates 408 can be directly coupled to assemblies 407, or indirectly coupled to assemblies 407 (e.g., via hermetic seals). Generally, "end plate" encompasses various types of end of stack designs which can comprise a single part or multiple parts such as electrical collector plates, compression plates, or manifold plates, depending on the stack design, which can have more metallic components. Further, interconnect assemblies 407 placed toward the ends of stack 400 can accommodate a CTE material on one side that allows hermetic sealing to the adjacent fuel cell element, and a CTE material on the opposing side, allowing hermetic sealing to end plates 408. Interconnect assemblies 404 provide CTE matching with adjacent fuel cell elements 402 via electrode interfaces (e.g., interfaces 218 and 222) as described above. Other components, such as a backing plate, load plate, and/or manifold, can be included in an end plate 408, which provides mechanical reinforcement, electrical paths, and/or fluid paths in stack 400 and help facilitate desired electrochemical operation therein.

FIG. 4 also illustrates how an interconnect assembly 404 can be joined to a fuel cell element 402 at both sides of fuel cell element 402. For example, a first interconnect assembly 404A is joined to fuel cell element 402B at a first interface side 428 of fuel cell element 402B, and a second interconnect assembly 404B is joined to fuel cell element 402B at a second interface side 430 opposite first interface side 428. First and second interconnect assemblies 404A and 404B can be joined to fuel cell element 402B via respective hermetic seals 406 as described above.

Figure 5:
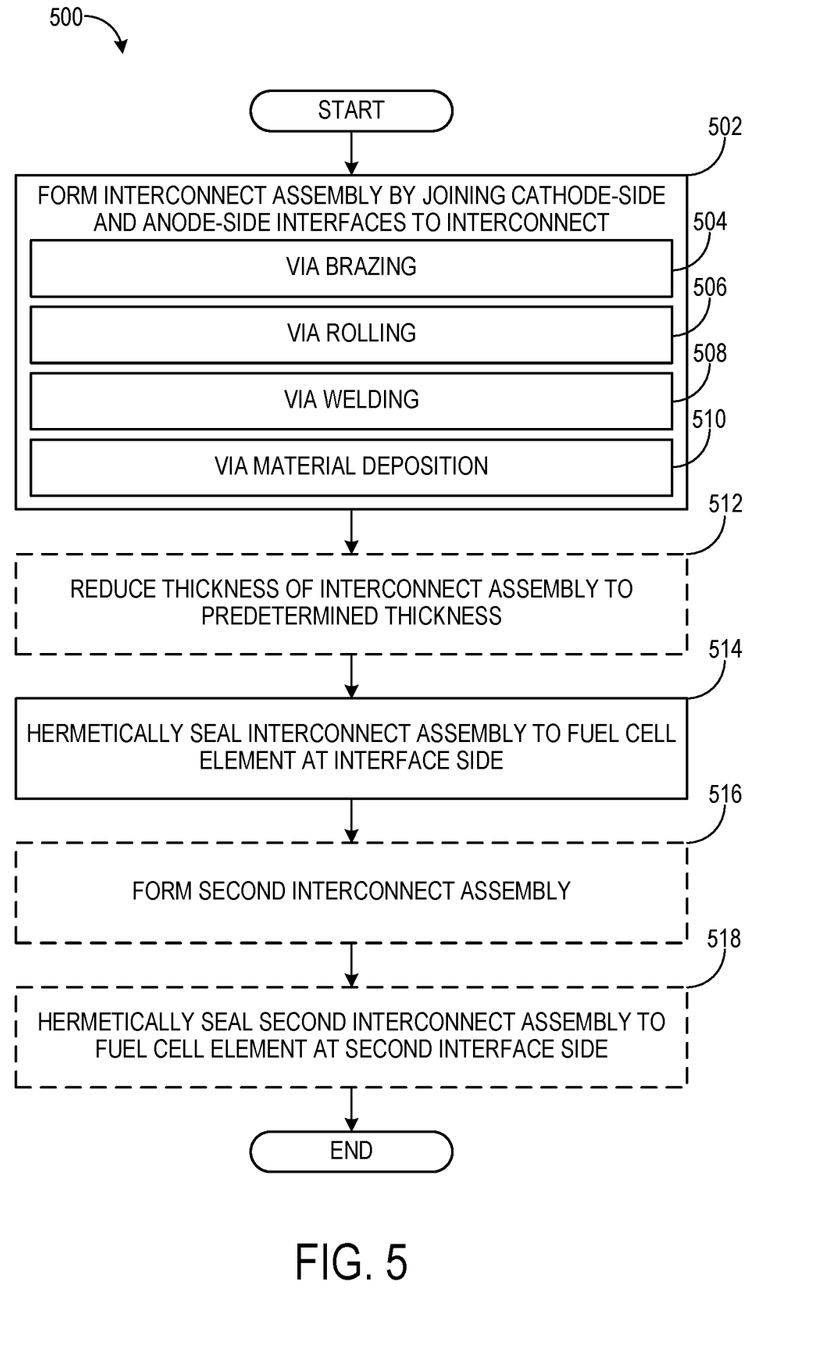
FIG. 5 shows an illustration of operations of a method performed according to an example embodiment of the present disclosure.

FIG. 5 shows a flowchart illustrating an example method 500 of manufacturing a fuel cell stack. Method 500 can be performed to manufacture one or more of fuel cell stacks 200, 250, 260 and stack 400, for example.

At 502, method 500 includes forming an interconnect assembly by joining a cathode-side interface to an interconnect at a first side of the interconnect, and joining an anode-side interface to the interconnect at a second side of the interconnect. The resulting interconnect assembly has a first CTE at an interface side of the interconnect assembly. In some examples, the interfaces can be joined to the interconnect via brazing 504. In these examples, joining the cathode-side interface to the interconnect can include forming a first hermetic braze joint between the cathode-side interface and the interconnect, and joining the anode-side interface to the interconnect can include forming a second hermetic braze joint between the anode-side interface and the interconnect. In other examples, the interfaces can be joined to the interconnect via rolling 506. In other examples, the interfaces can be joined to the interconnect via welding 508. In other examples, the interfaces can be joined to the interconnect via material deposition 510. In other examples, the interfaces can be joined to the interconnect via a suitable additive manufacturing technique.

At 512, method 500 optionally includes reducing a thickness of the interconnect assembly to a predetermined thickness. In some examples, reducing the thickness of the interconnect assembly can include grinding the interconnect assembly down to the predetermined thickness. Any suitable method of reducing the thickness of the interconnect assembly can be used, however.

At 514, method 500 includes hermetically sealing the interconnect assembly to a fuel cell element at the interface side, where the fuel cell element has a second CTE, and the first CTE of the interconnect assembly and the second CTE satisfy the predetermined CTE matching condition described above.

At 516, method 500 optionally includes forming a second interconnect assembly, where the interconnect assembly formed at 502 is a first interconnect assembly hermetically sealed to the interconnect assembly at a first interface side. At 518, method 500 optionally includes hermetically sealing the second interconnect assembly to the fuel cell element at a second interface side opposite the first interface side.

The approaches described herein can apply to other fuel cell types and arrangements, including but not limited to anode-supported SOFCs, planar and non-planar (e.g., tubular) SOFCs, and non-SOFC fuel cells. In general, the disclosed approaches provide mechanisms for hermetic sealing between interconnect assemblies and fuel cell elements at interfaces where interconnect assemblies and fuel cell elements are joined together.

The approaches described herein provide fuel cell elements, fuel cells, and fuel cell stacks that remain hermetically sealed from the release of reactant gases during pressurized and heated operation. The preservation of hermetic seals is enabled via CTE matching of electrode interfaces to fuel cell elements at interface sides, without constraining CTE matching between interconnects and fuel cell elements. As such, constraints placed on an interconnect due to CTE-matching of the interconnect with fuel cell elements are avoided. Further, electrode interfaces can be combined with other components having a different CTE to form an assembly that provides CTE-matching with fuel cell elements in the presence of different CTEs within the assembly. The preservation of hermetic sealing via a CTE-matched assembly can support increased fuel cell efficiency at reduced weight, and thus increased fuel economy, for mobile and fixed applications.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A fuel cell stack, comprising:
an interconnect assembly comprising:
a cathode-side interface coupled to an interconnect via a first joint; and
an anode-side interface coupled to the interconnect via a second joint,
the interconnect assembly comprising a metal interface side, the metal interface side having a first coefficient of thermal expansion (CTE); and
a fuel cell element comprising a ceramic interface side, the ceramic interface side being coupled to the metal interface side of the interconnect assembly via a hermetic seal, the ceramic interface side having a second CTE, the first CTE and the second CTE satisfying a CTE matching condition comprising the first CTE of the metal interface side and the second CTE of the ceramic interface side being within 10% of each other.

2. The fuel cell stack of claim 1, where the first joint and the second joint form respective hermetic seals.

3. The fuel cell stack of claim 1, where the interconnect assembly is unitary.

4. The fuel cell stack of claim 1, where the fuel cell element comprises one or more ceramic materials.

5. The fuel cell stack of claim 1, wherein the fuel cell element comprises an electrolyte, a cathode, and an anode, the cathode and the anode arranged on opposing sides of the electrolyte.

6. The fuel cell stack of claim 5, wherein the fuel cell element is a first fuel cell element, further comprising a plurality of cathode-side interface sections coupled to the cathode, and a plurality of anode-side interface sections coupled to an anode of a second fuel cell element.

7. The fuel cell stack of claim 1, where the first joint, the second joint, and the hermetic seal extend along a perimeter of the fuel cell element.

8. The fuel cell stack of claim 1, where the interconnect assembly is a first interconnect assembly and the metal interface side is a first metal interface side, and where the fuel cell stack further comprises a second interconnect assembly coupled to the fuel cell element at a second metal interface side opposite the first metal interface side.

9. The fuel cell stack of claim 1, where a material composition of the cathode-side interface and a material composition of the anode-side interface each differ from a material composition of the interconnect.

10. The fuel cell stack of claim 1, where the cathode-side interface and the anode-side interface comprise a metallurgy material.

11. The fuel cell stack of claim 1, wherein the interconnect assembly comprises different interface materials at either side of the interconnect assembly.

12. The fuel cell stack of claim 1, where a material composition of the cathode-side interface differs from a material composition of the anode-side interface.

13. A method of manufacturing a fuel cell stack, the method comprising:
forming an interconnect assembly by joining a cathode-side interface to an interconnect at a first side of the interconnect, and joining an anode-side interface to the interconnect at a second side of the interconnect, the interconnect assembly comprising a metal interface side having a first coefficient of thermal expansion (CTE); and
hermetically sealing the metal interface side of the interconnect assembly to a ceramic interface side of a fuel cell element, the ceramic interface side having a second CTE, the first CTE and the second CTE satisfying a CTE matching condition comprising the first CTE of the metal interface side and the second CTE of the ceramic interface side being within 10% of each other.

14. The method of claim 13, further comprising reducing a thickness of the interconnect assembly.

15. The method of claim 13, where joining the cathode-side interface to the interconnect includes forming a first hermetic braze joint, and wherein joining the anode-side interface to the interconnect includes forming a second hermetic braze joint.

16. The method of claim 13, where the interconnect assembly is unitary.

17. The method of claim 13, where the interconnect assembly is a first interconnect assembly and the metal interface side is a first metal interface side, the method further comprising forming a second interconnect assembly, and hermetically sealing the second interconnect assembly to the fuel cell element at a second metal interface side opposite the first metal interface side.

18. A solid oxide fuel cell stack, comprising:
a unitary interconnect assembly comprising:
a cathode-side interface coupled to an interconnect via a first braze joint; and
an anode-side interface coupled to the interconnect via a second braze joint, the interconnect assembly comprising a metal interface side, the metal interface side having a first coefficient of thermal expansion (CTE); and
a fuel cell element comprising a ceramic interface side, the ceramic interface side being coupled to the metal interface side of the interconnect assembly via a hermetic seal, the ceramic interface side having a second CTE, the first CTE and the second CTE satisfying a CTE matching condition comprising the first CTE of the metal interface side and the second CTE of the ceramic interface side being within 10% of each other.

19. The solid oxide fuel cell stack of claim 18, where the unitary interconnect assembly is a first interconnect assembly and the metal interface side is a first metal interface side, the fuel cell stack further comprising a second interconnect assembly coupled to the fuel cell element at a second metal interface side opposite the first metal interface side.

20. The solid oxide fuel cell stack of claim 18, where a material composition of the cathode-side interface and a material composition of the anode-side interface each differ from a material composition of the interconnect.

\* \* \* \* \*